United States Patent Office 3,515,296
Patented June 2, 1970

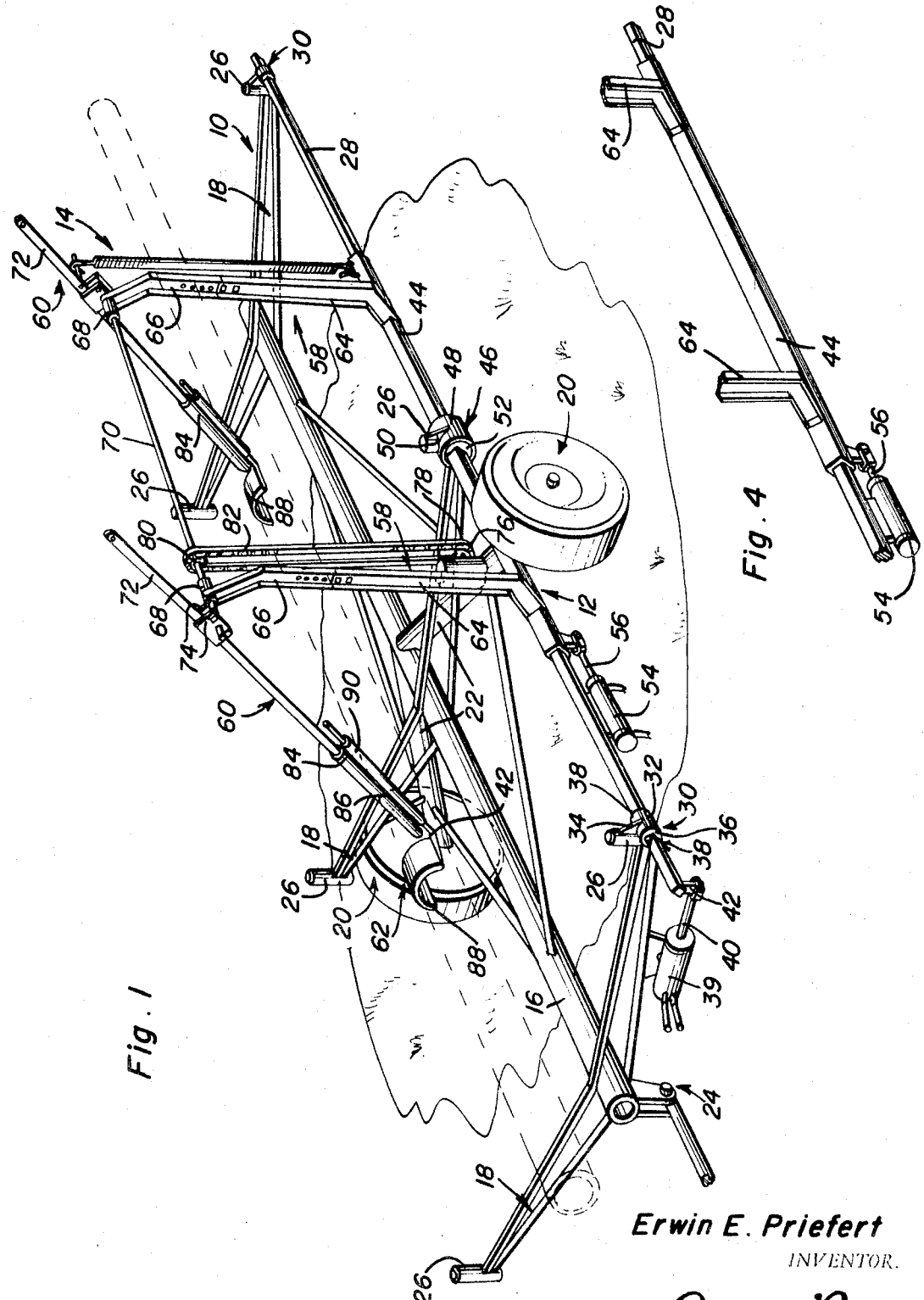

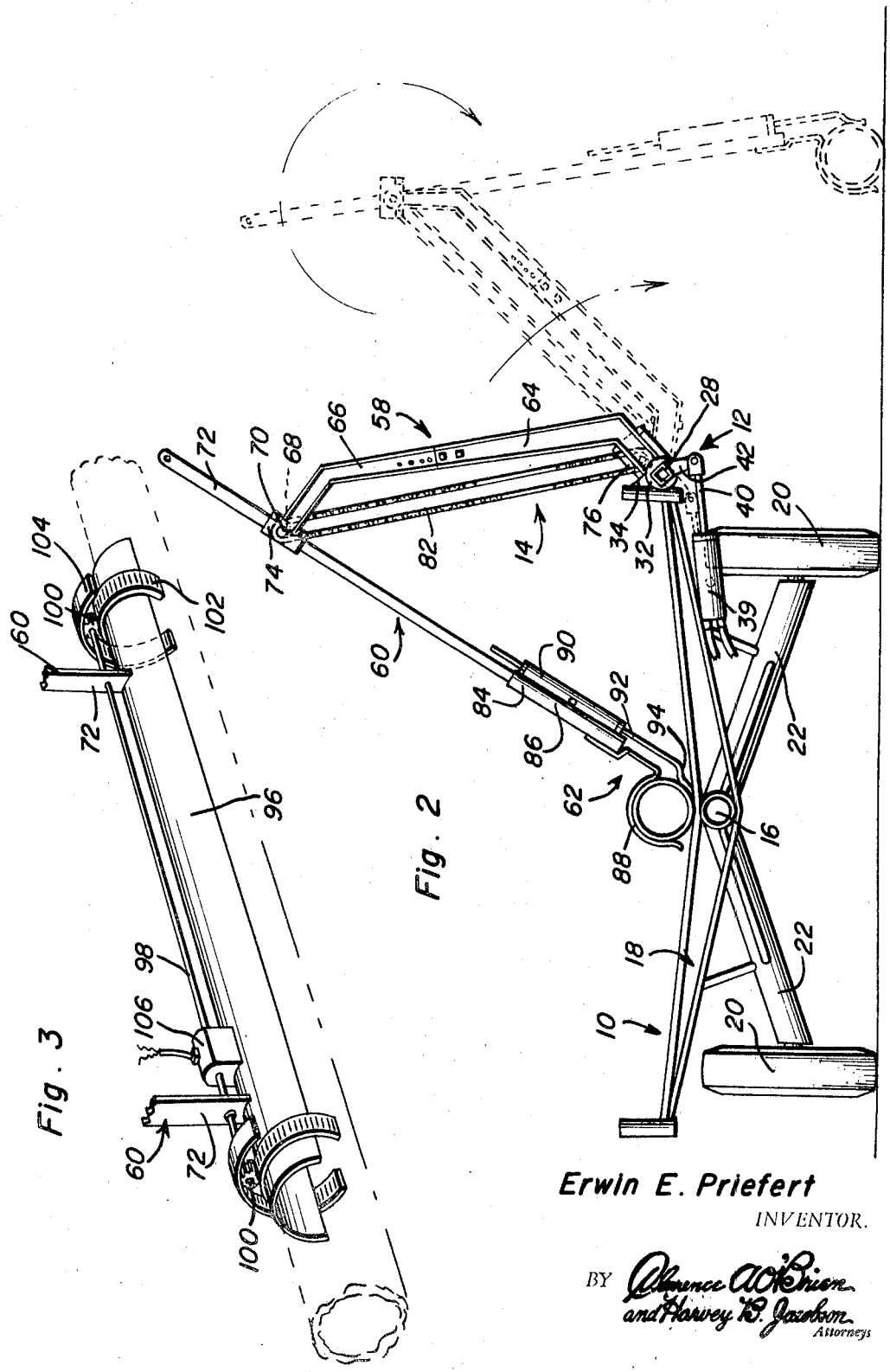

3,515,296
IRRIGATION PIPE LOADER
Erwin E. Priefert, R.F.D. 1, Belvidere, Nebr. 68315
Filed Sept. 9, 1968, Ser. No. 758,470
Int. Cl. B60p 1/48
U.S. Cl. 214—77                                    6 Claims

ABSTRACT OF THE DISCLOSURE

A device for loading irrigation pipes onto and off of a pipe cart that eliminates handling of the pipe and allows it to be picked off the ground and deposited on the cart, and conversely, to be taken off the cart and deposited on the ground in the proper position for use. The device has a pair of arms pivoted above the bed of the pipe cart and pivoted along a longitudinal axis thereof to grasp the pipes and rotate about said axis to move the pipes between the ground and the pipe cart bed.

---

Heretofore, the retrieving and the laying out of irrigation pipes on farms, etc. has been a time-consuming and strenuous operation. Generally when a pipe loader is intended for general use the device is a rather cumbersome and expensive unit that grips the pipes and deposits them on the pipe cart bed. Some of the devices do not grasp the pipe but rely on a rolling into and out of position on the cart, thereby when loading the pipe onto the cart severe banging together of the pipes results and when depositing the pipe on the ground precise positioning of the pipe is impossible so that lifting and moving about of the pipe is required to get it into position. Pipe loaders intended specifically for irrigation pipe, thereby providing for grasping and lifting and depositing of the pipe in position whether the position be on the ground or on the cart, have been large and intricate machines intended for use only on extremely large operations with the cost of same being prohibitive to the average farmer.

The instant invention relates to an irrigation pipe loader that positively grasps each unit of pipe to deposit it on the load bed of the pipe cart or on the ground in the proper position. The device comprises a pair of base legs pivoted to the exterior of the load bed of the pipe cart along a longitudinal axis thereof. A pair of arms are pivoted to the ends of the base legs along a longitudinal axis parallel to the first axis whereby the arms may pivot from a position adjacent the ground where it may grasp a pipe and through an arc wherein it may pick up or release a pipe from the bed of the cart. By positively grasping each pipe length and maintaining such grip throughout the travel of the pipe from the ground to the bed or the reverse, no manual handling of the pipe is necessary to get it in position on the ground or to assure uniform piling on the bed of the cart.

It is therefore an object of this invention to provide a simple but unique pipe loader that is economical in construction.

It is a further object of this invention to provide a pipe loader that firmly grasps each pipe unit being maneuvered, thereby preventing uncontrolled rolling or banging together of pipe sections.

It is a further object of this invention to provide a pipe loader whose articulated arms are adjustable in length and adjustable longitudinally of the vehicle attached to.

It is a still further object of this invention to provide a pipe loader that can move the pipes from a position on the ground to the load bed of the pipe cart without additional handling or maneuvering of the pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the subject device positioning a pipe on the bed of the pipe cart.

FIG. 2 is an end view of the device as shown in FIG. 1 with the device shown picking a pipe off the ground in phantom.

FIG. 3 is a perspective view of a modified form of the pipe gripping assembly.

FIG. 4 is an enlarged perspective view of the base mounting assembly of the subject device.

Referring now to the drawings, numeral 10 generally designates a pipe cart, with the base mounting assembly indicated at 12 and the loading mechanism indicated by the numeral 14. The pipe cart 10 is a standard two-wheeled pipe cart and does not constitute a part of the invention but is shown herein to disclose the environment in which the subject device is to be used. The pipe cart is provided with a load supporting structure or bed including a longitudinal frame member 16 having three V-shaped cradles 18 spaced along the length thereof. A pair of wheels 20 are journaled from the outer ends of a pair of oppositely laterally outwardly extending frame members 22 fixed at their inner ends to opposite sides of the longitudinal frame member 16 slightly to the rear of the mid-point thereof. The cart is provided with a towing tongue 24 and upwardly extending stanchions 26 at the ends of each of the V-shaped cradles 18.

The base mounting assembly 12 is attached to the stanchions 26 along one side of the load bed of the pipe cart and comprises a main longitudinal member 28 of square cross-section which is journaled for rotation along an axis parallel to the longitudinal frame member 16 of the pipe cart. The main longitudinal member 28 is journaled for rotation in a pair of bearing blocks 30 mounted on the stanchions at the front and rear of the pipe cart. The bearing blocks 30 consist of a horizontally extending cylindrical member 32 which is fixed to the stanchion 26 and has a web portion 34 to insure rigidity in the mounting thereto. The main longitudinal member 28 extends through cylindrical inserts 36 journaled for rotation in the horizontal cylindrical members 32. The inserts 36 have a square opening therethrough to accommodate the square cross-section of the longitudinal member 28 and thereby permit the member 28 to rotate within the bearing block 30. The main member 28 is fixed against longitudinal movement within the cylindrical inserts 36 by any convenient means, such as the cotter pins 38 mounted through the longitudinal member on either side of the insert. The longitudinal member 28 is rotated about its axis by a hydraulic ram assembly 39 which has the cylinder thereof pivotally fixed to the pipe cart. The piston rod 40 of the hydraulic ram assembly is pivotally mounted at the free end thereof to a crank 42 fixed to the longitudinal member 28. Thus the longitudinal extension or retraction of the piston rod 40 rotates the longitudinal member 28 in its bearing blocks 30, so that the loading device may be pivoted on its base mounting to lend further versatility to the lifting procedure. A base mounting sleeve 44 is square in cross-section and slightly larger in interior dimension than the outside dimension of the longitudinal member 28 so that the sleeve 44 may slide therealong. The sleeve is mounted approximately at the mid-point of the longitudinal member 28 and extends through a center bearing block 46 which has a horizontally extending cylindrical member 48 fixed to the stanchion 26 and having a web 50 attached therebetween to insure the rigidity of the mounting. A cylindrical insert 52 is journaled for rotation in the horizontal cylindrical member 48 and has a square cut-out therethrough to receive the sleeve 44 therethrough. To provide for the longitudinal movement of the sleeve 44 along member 28 a hydraulic ram assembly 54 is fixed to the member 28 with the piston rod 56 thereof fixed to the sleeve 44. Thus by extension or retraction of the piston rod 56 the sleeve 44 can be moved longitudinally of the member 28 thereby allowing the loading mechanism to be positioned about the center of gravity of the pipe to be lifted. Similarly with the concentric relationship of the member 28 and the sleeve 44, rotation of the member 28 by the hydraulic ram assembly 39 will rotate both the sleeve 44 and the member 28 about the longitudinal axis.

The loading mechanism 14 of the pipe loader consists of a base leg assembly 58, a lifting arm assembly 60, and the pipe clamping mechanism 62. The base leg assembly 58 has a pair of lower leg sections 64 which are attached to the base mounting sleeve at their lower ends, and a pair of upper leg sections 66 attached to the upper ends of the lower leg sections 64. The lower and upper leg sections are extensibly connected together so that the length of the base leg assembly 58 can be adjusted to compensate for a large pile of pipe on the pipe cart or for a longer reach necessary to place the irrigation pipe in position on the ground. The upper leg sections 66, at their upper or free ends, have a bearing sleeve 68 fixed thereto in longitudinal alignment thereon to define an axis of rotation for a shaft 70 inserted therethrough parallel to the axis of member 28. The lifting arm assemblies comprise a pair of tubular arms 72 which are adjustably fixed to the shaft 70 for rotation therewith. The arms 72 are fastened to the ends of the shaft 70, extending beyond the upper leg sections 66, by any convenient means such as the clamping plates 74 which are fixed to the shaft 70 to clamp the tubular arms therebetween. A drive is provided for the lifting arm assembly by a motor 76 attached to one of the lower leg sections 64 with a sprocket 78 on the drive shaft thereof. A similar sprocket 80 is fixed to the shaft 70 in longitudinal alignment with the drive sprocket 78 which receives a chain 82 therearound. Thus, when the motor 76 is actuated the shaft 70 will be rotated and the lifting arm assemblies 60 can rotate approximately 320° about the shaft 70 to define an arc between the bed of the pipe cart and the ground. This degree of movement provided for the lifting arm assembly combined with the rotation of the base leg assemblies 58 by the hydraulic ram assembly 39, as shown in FIG. 2, provides a great degree of movement in the movement of the irrigation pipe. Further, the adjustability of the length of the base leg assemblies and the lifting arm assemblies allows a great degree of adjustability in the lifting span of the pipe loader. The power for the motor 76 can be any convenient source of power, such as hydraulic thereby using the same source of power as the hydraulic ram assemblies 38 and 54, or electric to be driven from the towing vehicle's electrical system.

The pipe clamping mechanism is attached to the end of the lifting arms 60 remote from the pivot point about shaft 70 and has sleeves 84, whose inside diameter is slightly larger than the outside diameter of the tubular arms 72, received thereover. The sleeves 84 are held on the tubular arms 72 by a pin 86 extending through the sleeve 84 and the tubular arm 72. A collar 88 of approximately 180° circumference is attached to the end of the sleeve 86 to surround half of the circumference of an irrigation pipe to be picked up. A hydraulic ram assembly 90 is attached 180° from the collar 88 on the sleeve 84. The piston 92 of the hydraulic ram assembly has an angular end 94 adapted to move longitudinally of the sleeve 84 so that when it extends across the open portion of the collar a sufficient amount of the circumference of the irrigation pipe will be encompassed to prevent its movement thereout. Thus it can be seen, when it is desired to pick up a pipe the base leg and lifting arm assemblies are positioned such that the collar 88 will rest on the circumference of an irrigation pipe at which point the piston rod 92 of the hydraulic ram assembly will be extended causing the angular end 94 thereon to engage a point on the circumference of the irrigation pipe opposite the open section of the collar to clamp it therein and permit it to be lifted and positioned where desired. With the entire pipe clamping mechanism 62 held onto the lifting arm assembly by the pin 86 it can be readily seen that the clamping assembly can be changed if desired to accommodate larger pipe, or it can be rotated 180° and the pin 86 reinserted to permit picking up pipe on the opposite side of the cart or where it is not convenient to fit the collar therearound.

Thus it can be seen from the drawings that when it is desired to utilize the pipe loader as set forth herein, the base leg assembly and lifting arm assemblies are positioned as in FIG. 2 of the drawing to place the collar 88 of the clamping mechanism on an irrigation pipe. The piston rod 92 is then extended with the angular end 94 clamping the pipe in the clamping mechanism. The hydraulic ram assembly 39 can be actuated to rotate the base leg assembly 58 to whatever position desired and the lifting arm assemblies rotated by the motor 76 about the shaft 70 to place the pipe on the ground such as shown in dotted lines in FIG. 2. The piston rod 92 would then be withdrawn releasing the pipe from the clamping mechanism. Thus it can be seen the reverse procedure would be applicable when lifting the irrigation pipe off the ground to be loaded onto the cart. The versatility of the device is controlled by the adjustable length of the base leg assembly and the lifting arm assemblies. Similarly the entire lifting mechanism can be moved longitudinally of the cart by actuation of the hydraulic ram assembly 54 which moves the sleeve 44 along the main longitudinal member 28. Thus, when placing the pipe on the ground to be connected to the next adjacent pipe already installed, longitudinal movement is possible so that the pipe does not have to be lifted and moved manually. Similarly, when loading pipe onto a vehicle longitudinal movement becomes a great convenience to distribute the load evenly.

An alternative pipe clamping mechanism is shown in FIG. 3 of the drawing wherein an elongated collar 96, of approximate semi-circular configuration, is attached between the free ends of the lifting arm 72. A shaft 98 is journaled for rotation adjacent the collar 96 in the arms 72. The ends of the shaft 98 have pinions 100 attached thereon which cooperate with two semi-circular rack sections 102 and 104. The lower rack section 102 has the gear teeth on the outer circumference thereof to cooperate with the pinion 100 and the upper rack section 104 has the gear teeth on the inner circumference thereof to cooperate with the pinion 100 thus allowing rotation of the shaft 98 to drive the racks 102 and 104 in opposite directions thereby surrounding a section of irrigation pipe over which the collar 96 rests. Any convenient drive for the shaft 98 can be provided by a motor 106 attached to the collar adjacent the shaft to thereby drive it. The rack sections 102 and 104 are suitably held in sliding relation on the collar 96 to keep them in alignment when extending around the irrigation pipe and to prevent their loss from the collar.

As can be seen from the operation of the pipe loader, set forth hereinabove, a relatively simple loading device is provided that permits the average farmer to enjoy the use of such a device in his irrigation system without the attendant size and expense of the current pipe loading devices. The simplicity of the construction allows great versatility as to mode of operation and lift and span obtainable therewith.

It is also within the purview of this invention that the lifting arm assemblies 60 may be separately operated thus enabling an operator of the loading device to extend one arm further than the other arm when picking up a pipe that might not be lying parallel to the loading mechanism. The lift arms 60 could be replaced by telescopic hydraulic piston and cylinders to provide for independent extension and retraction of the arms when the machine is in use to enable pipes oriented in various positions to be reached by the pipe clamping mechanism.

The foregoing is considered as illustrative only of the principles of the invention. Further, since numerous modifications and changes will readily occur to those skilled in the art, it is not desired to limit the invent ion to the exact construction and operation shown and described, and accordingly all suitable modifications and equivalents may be resorted to, falling within the scope of the invention.

What is claimed as new is as follows:

1. In combination with an elongated vehicle adapted to be longitudinally advanced and including a load supporting structure for supporting a plurality of elongated pipe sections extending longitudinally of the vehicle, an elongated mounting portion extending along and journalled from one side of said vehicle for oscillation relative to the latter, means operatively connected between said vehicle and said mounting portion operative to adjustably rotate the latter relative to said vehicle, a leg assembly mounted on said mounting portion for adjustable rotation therewith and for adjustable sliding movement therealong, means operatively connected between said mounting portion and said leg assembly operable to adjustably shift said leg assembly along said mounting portion, said leg assembly including a pair of legs having generally parallel free ends projecting generally radially outwardly from said mounting portion in fixed spatial relation to each other and at points spaced longitudinally along said mounting portion, a pair of generally parallel lift arms having one pair of corresponding ends oscillatably supported from the free ends of said legs for swinging movement of the other pair of ends thereof in unison about axes extending between said legs and arms, means connected between said arms and said legs for adjustably swinging said arms relative to said legs, and pipe engaging means carried by said other ends of said arms operative to grip and support elongated pipe sections from points spaced longitudinally along said pipe sections.

2. The device of claim 1 wherein said legs are adjustable in length.

3. The device of claim 1 wherein said arms are adjustable in length relative to the free ends of said legs.

4. The device of claim 1 wherein said pipe engaging means includes a semi-circular collar fixed relative to each arm and a rod member movable relative to each arm to close the corresponding semi-circular collar.

5. The device of claim 1 wherein said pipe engaging means comprises a semi-circular collar fixed and extending between the other ends of said arms with pairs of semi-circular bands mounted on said collar for movement in opposed directions relative to one another to close the semi-circular collar.

6. The combination of claim 1 wherein said mounting portion comprises an elongated member of non-circular cross-section and said leg assembly includes an elongated sleeve slidably mounted on said elongated member for oscillation therewith, said legs including base ends secured to said sleeve at points spaced longitudinally therealong.

References Cited
UNITED STATES PATENTS

| | | | |
|---|---|---|---|
| 220,193 | 9/1879 | Vaders | 294—103 XR |
| 2,520,196 | 8/1950 | Boone. | |
| 2,697,529 | 12/1954 | Hubbell et al. | |
| 3,021,167 | 2/1962 | Ostdiek | 294—86 |
| 3,416,684 | 12/1968 | Barry. | |

FOREIGN PATENTS 572,428  1/1958  Italy.

GERALD M. FORLENZA, Primary Examiner

F. E. WERNER, Assistant Examiner

U.S. Cl. X.R.

214—1, 147